(12) United States Patent
Warner et al.

(10) Patent No.: US 6,985,893 B1
(45) Date of Patent: *Jan. 10, 2006

(54) USAGE BASED STRENGTH BETWEEN RELATED HELP TOPICS AND CONTEXT BASED MAPPING THEREROF IN A HELP INFORMATION RETRIEVAL SYSTEM

(76) Inventors: Douglas K. Warner, 9717 Cougar Dr., Bozeman, MT (US) 59718; Michael A. Myer, 3011 Trail Creek Rd., Bozeman, MT (US) 59715

(*) Notice: Subject to any disclaimer, the term of this patent is extended or adjusted under 35 U.S.C. 154(b) by 0 days.

This patent is subject to a terminal disclaimer.

(21) Appl. No.: 09/549,667

(22) Filed: Apr. 14, 2000

(51) Int. Cl.
*G06F 17/30* (2006.01)
*G06F 17/00* (2006.01)

(52) U.S. Cl. .......................................... 707/2; 707/102

(58) Field of Classification Search ............ 707/1–104, 707/500–504; 704/1, 9, 10; 345/745–748, 345/339; 715/501.1
See application file for complete search history.

(56) References Cited

U.S. PATENT DOCUMENTS

| | | | |
|---|---|---|---|
| 5,537,618 A * | 7/1996 | Boulton et al. .............. | 345/745 |
| 6,021,409 A | 2/2000 | Burrows ...................... | 707/102 |
| 6,081,774 A * | 6/2000 | De Hita et al. .................. | 704/9 |
| 6,188,405 B1 * | 2/2001 | Czerwinski et al. ........ | 345/764 |
| 6,301,579 B1 * | 10/2001 | Becker ........................ | 707/102 |
| 6,631,496 B1 * | 10/2003 | Li et al. ................... | 715/501.1 |

FOREIGN PATENT DOCUMENTS

WO   WO 00 17793 A   3/2000

OTHER PUBLICATIONS

Mobasher et al., "Creating adaptive Web sites through usage-based clustering of URLs", *Knowledge and Data Engineering Exchange*, 1999. (KDEX '99); Proceedings. 1999 Workshop on Chicago, IL, USA, Nov. 7, 1999; Los Alamitos, CA, USA, IEEE Comput. Soc., US, 2000, pp. 19-25.

Yan et al., "From user access patters to dynamic hypertext linking", *Computer Networks and ISDN Systems*; North Holland Publishing, Amsterdam, NL. vol. 28, No. 11. May 1, 1996, pp. 1007-1014.

* cited by examiner

*Primary Examiner*—Uyen Le
*Assistant Examiner*—Susan Y. Chen
(74) *Attorney, Agent, or Firm*—Dorsey & Whitney LLP

(57) ABSTRACT

An information retrieval system allows a user to navigate through a plurality of informational items for a desired informational item, and upon selection of an informational item, presents other informational items related to the selected informational item. The information retrieval system in accordance with the principles of the present invention maintains a database that defines a relational association between a plurality of informational items in the system. The relational association is based on historical navigational behavior of users of the information retrieval system, and includes a relationship type, which is based on the characteristic similarities between the informational items, and relationship strength, which is based on the historical frequency of any related informational items being selected by a user within the same information retrieval session. When a navigation from one informational item to another informational item is detected, the relationship type and the relationship strength of the two informational items are determined and stored in the database. During a subsequent selection of an informational item, any related informational items related to the selected informational item are sorted based on the respective relationship types and relationship strengths, and are provided in a sorted list from which the user can select.

9 Claims, 9 Drawing Sheets

| INFORMATIONAL ITEM | RELATED INFORMATIONAL ITEM | RELATIONSHIP TYPE | RELATIONSHIP STRENGTH |
|---|---|---|---|
| INFO. ITEM 1 | INFO. ITEM A | GENERAL | STR 1 |
| | INFO. ITEM B | CHAR 1 | STR 3 |
| | INFO. ITEM C | CHAR 2 | STR 9 |
| INFO. ITEM 2 | INFO. ITEM D | GENERAL | STR 4 |
| | INFO. ITEM X | CHAR 1 | STR 15 |
| | INFO. ITEM C | CHAR 2 | STR 3 |
| | INFO. ITEM D | CHAR 3 | STR 7 |
| | INFO. ITEM A | CHAR 3 | STR 2 |
| ⋮ | ⋮ | ⋮ | ⋮ |
| INFO. ITEM N | INFO. ITEM X | GENERAL | STR 1 |
| | INFO. ITEM Y | CHAR 1 | STR m |
| | INFO. ITEM Z | CHAR 2 | STR n |

FIG. 2

| INFORMATIONAL ITEM | RELATED INFORMATIONAL ITEM | RELATIONSHIP TYPE | RELATIONSHIP STRENGTH |
|---|---|---|---|
| ROSE | FIRE TRUCK | RED | 4 |
| | FIRE TRUCK | GENERAL | 4 |
| | DAISY | FLOWER | 10 |
| | DAISY | SCENT | 5 |
| | DAISY | GENERAL | 18 |
| | SHAKESPEARE | NAME | 2 |
| | SHAKESPEARE | GENERAL | 3 |
| ⋮ | ⋮ | ⋮ | ⋮ |
| INFO. ITEM N | INFO. ITEM X | GENERAL | STR 1 |
| | INFO. ITEM Y | CHAR 1 | STR m |
| | INFO. ITEM Z | CHAR 2 | STR n |

FIG. 2A

YOU HAVE SELECTED

ROSE ⟋305

CLICK ON LINK TO VIEW

---

RELATED INFORMATION FOR "ROSE" ⟋308

RELATED BY CHARACTERISTICS-"GENERAL"= ⟋309

1. DAISY (STRENGTH = 18) ⟋310
2. FIRE TRUCK (STRENGTH = 4) ⟋310
3. SHAKESPEARE (STRENGTH = 3) ⟋310

MORE ⟋311

RELATED BY CHARACTERISTICS-"RED"= ⟋312

1. FIRE TRUCK (STRENGTH=4) ⟋313

MORE ⟋314

RELATED BY CHARACTERISTICS-"FLOWER"= ⟋315

1. DAISY (STRENGTH = 10) ⟋316

MORE ⟋317

RELATED BY CHARACTERISTICS-"SCENT"= ⟋318

1. DAISY (STRENGTH = 5) ⟋319

MORE ⟋320

RELATED BY CHARACTERISTICS-"NAME"= ⟋321

1. SHAKESPEARE (STRENGTH =2) ⟋322

MORE ⟋323

FIG. 3

| INFORMATIONAL ITEM | RELATED INFORMATIONAL ITEM | RELATIONSHIP TYPE | RELATIONSHIP STRENGTH |
|---|---|---|---|
| INFO. ITEM 1 | INFO. ITEM A | GENERAL | STR 1 |
| | INFO. ITEM B | CHAR 1 | STR 3 |
| | INFO. ITEM C | CHAR 2 | STR 9 |
| ⋮ | ⋮ | ⋮ | ⋮ |
| INFO. ITEM N | INFO. ITEM X | GENERAL | STR 1 |
| | INFO. ITEM Y | CHAR 1 | STR m |
| | INFO. ITEM Z | CHAR 2 | STR n |
| ITEM LOC 1 | INFO. ITEM D | HELP | STR 4 |
| | INFO. ITEM E | HELP | STR 6 |
| | INFO. ITEM F | HELP | STR 9 |
| ⋮ | ⋮ | ⋮ | ⋮ |
| ITEM LOC N | INFO. ITEM Q | HELP | STR 1 |
| | INFO. ITEM R | HELP | STR m |
| | INFO. ITEM S | HELP | STR n |

FIG. 5

USAGE BASED STRENGTH BETWEEN RELATED HELP TOPICS AND CONTEXT BASED MAPPING THEREROF IN A HELP INFORMATION RETRIEVAL SYSTEM

RELATED APPLICATION

The present application is related to an application for US Letter patent, entitled "Usage Based Strength Between Related Information in an Information Retrieval System" by the present inventors, assigned to the assignee of the present application, having U.S. patent application Ser. No. 09/549,568, and filed concurrently on even date herewith, Apr. 14, 2000.

TECHNICAL FIELD

The present invention generally relates to information search and retrieval systems. More particularly the present invention relates to providing related informational items during an information retrieval session to enhance the performance and efficiency of an information retrieval system.

BACKGROUND ART

A database is useful only if a desired item can be efficiently found and retrieved therefrom. To locate and retrieve a desired information item in an information database, a search of the database, e.g., based on a keyword or a text string, may be required. The search typically involves finding entries matching the keyword (or string) in an index created from parsing the information items into searchable words and the location in which the word appears in the database. For example, the Internet, or the world wide web (WWW) may be considered as a very large database of information items, in the form of web pages, distributed over a very wide network. Currently available search engines, e.g., the YAHOO™, EXCITE™, and the like, maintain an index of the entire content of the WWW parsed into searchable words and corresponding locations, e.g., the Uniform Resource Locators (URL).

However, as the size of a database becomes very large (e.g., the number of web pages in the WWW is currently in the hundreds of millions, and growing fast), a user may have to navigate through, i.e., select and review, a significant number of informational items before arriving at the one desired informational item. The navigation through the ever increasing number of informational item to find the one desired informational item is often proved difficult, and requires a considerable investment of time, effort, and sometimes even good fortune, on the part of the user.

Unfortunately, in a conventional information retrieval system, even after finding the sought after information once, to find the same information again, unless the user remembers the location of the information, the user may have to follow the same navigational trail, again spending the required time and effort. Moreover, a subsequent user looking for the same information would have to duplicate the time and effort, i.e., must re-invent-the-wheel, in order to find the information, and often ends an information retrieval session in frustration without finding the desired information. This duplicated effort is wasteful and inconvenient, and thus diminishes the usefulness of the database.

Moreover, in a conventional help information retrieval system, the help information items are fixedly mapped, requiring a user to always follow the same help menu path to arrive at a particular help item of interest. Even if the path is ultimately proven to be inefficient, the inefficient path nevertheless must always be followed in order to retrieve that particular help item. The efficiency of a particular path to be taken may depend on the context in which the help item is sought. Because the fixed mapping cannot account for the various contexts, it is inefficient, and thus diminishes the usefulness of the help information retrieval system.

Thus, what is needed is an efficient system for and method of a convenient and economical retrieval of the one desired informational item in an informational retrieval system that allows leveraging of the time and effort invested during prior information retrieval sessions.

What is also needed is an efficient system and method for a dynamic and context sensitive mapping of help items in a help information retrieval system.

SUMMARY OF INVENTION

In accordance with the principles of the present invention, a method of, and an apparatus for, providing related informational items having a usage based relationship strength in an information retrieval system comprises, the steps of, and the means for, respectively, providing a database having one or more record entries, the one or more record entries defining relationships between originating locations from which help requests are originated and corresponding ones of the plurality of help informational items, and the one or more record entries each including an associated relationship strength value based on historical frequency of selection of the respective corresponding ones of the plurality of help informational items during a help information retrieval session initiated from the originating locations, upon detection of a user initiation of a help information retrieval session from an originating location, determining whether one or more matching record entries exist in the database for the originating location, and providing, if the one or more matching record entries exist, an access to one or more associated help informational items corresponding to the originating location according to the one or more record entries.

In addition, in accordance with the principles of the present invention, an information retrieval system, comprises a plurality of help informational items, and a database having one or more record entries, the one or more record entries defining relationships between locations from which help requests originated and corresponding ones of the plurality of help informational items, and the one or more record entries each including an associated relationship strength value based on historical frequency of selection of respective the corresponding ones of the plurality of help informational items during a help information retrieval session initiated from the originating locations.

Also, in accordance with the principles of the present invention, a computer readable storage medium having stored thereon computer program for implementing a method of providing a context sensitive mapping of a plurality of help informational items in an information retrieval system, the computer program comprises a set of instructions for providing a database having one or more record entries, the one or more record entries defining relationships between originating locations from which help requests are originated and corresponding ones of the plurality of help informational items, and the one or more record entries each including an associated relationship strength value based on historical frequency of selection of respective the corresponding ones of the plurality of help informational items during a help information retrieval session initiated from the originating locations; upon detection of a user initiation of a help information retrieval session from an originating location, determining whether one or more matching record entries exist in the database for the originating location, and providing, if the one or more matching record entries exist, an access to one or more associated help informational items corresponding to the originating location according to the one or more record entries.

DESCRIPTION OF DRAWINGS

Features and advantages of the present invention will become apparent to those skilled in the art from the following description with reference to the drawings, in which:

FIG. 2 is an exemplary table showing the relevant portions of the relationship database shown in FIG. 1;

FIG. 2A is an exemplary table showing one possible example of the contents of the table shown in FIG. 2;

FIG. 3 shows an exemplary embodiment of the user interface screen of the information retrieval system in accordance with the principles of the present invention;

FIG. 5 is an exemplary table showing the relevant portions of the relationship database shown in FIG. 1, as modified to include the help relationship type for the help information retrieval system in accordance with the principles of the present invention;

DETAILED DESCRIPTION OF PREFERRED EMBODIMENTS

For simplicity and illustrative purposes, the principles of the present invention are described by referring mainly to an exemplar embodiment, particularly, with references to the Internet and the world wide web (WWW) as the exemplary databases of informational items. However, one of ordinary skill in the art would readily recognize that the same principles are equally applicable to, and can be implemented in, other informational databases, and that any such variation would be within such modifications that do not depart from the true spirit and scope of the present invention.

An information retrieval system in accordance with the principles of the present invention allows a user to navigate through a plurality of informational items for a desired informational item, and upon selection of an information item, presents other informational items related to the selected informational item. The information retrieval system in accordance with the principles of the present invention maintains a database that defines a relational association between a plurality of informational items in the system.

The relational association is based on historical navigational behavior of users of the information retrieval system, and includes a relationship type, which is based on the characteristic similarities between the informational items, and relationship strength, which is based on the historical frequency of any related informational items being selected by a user within the same information retrieval session.

When a navigation from one informational item to another information item is detected, the relationship type and the relationship strength of the two informational items are determined and stored in a database. During a subsequent selection of an informational item, any informational items related to the selected informational item may be presented to the user, sorted based on the respective relationship types and relationship strengths, and may be provided in a sorted list from which the user can select.

In an aspect of the present invention, the inventive informational retrieval system is utilized in a help information retrieval system to provide a dynamic context sensitive mapping of help informational items.

Figure 1:
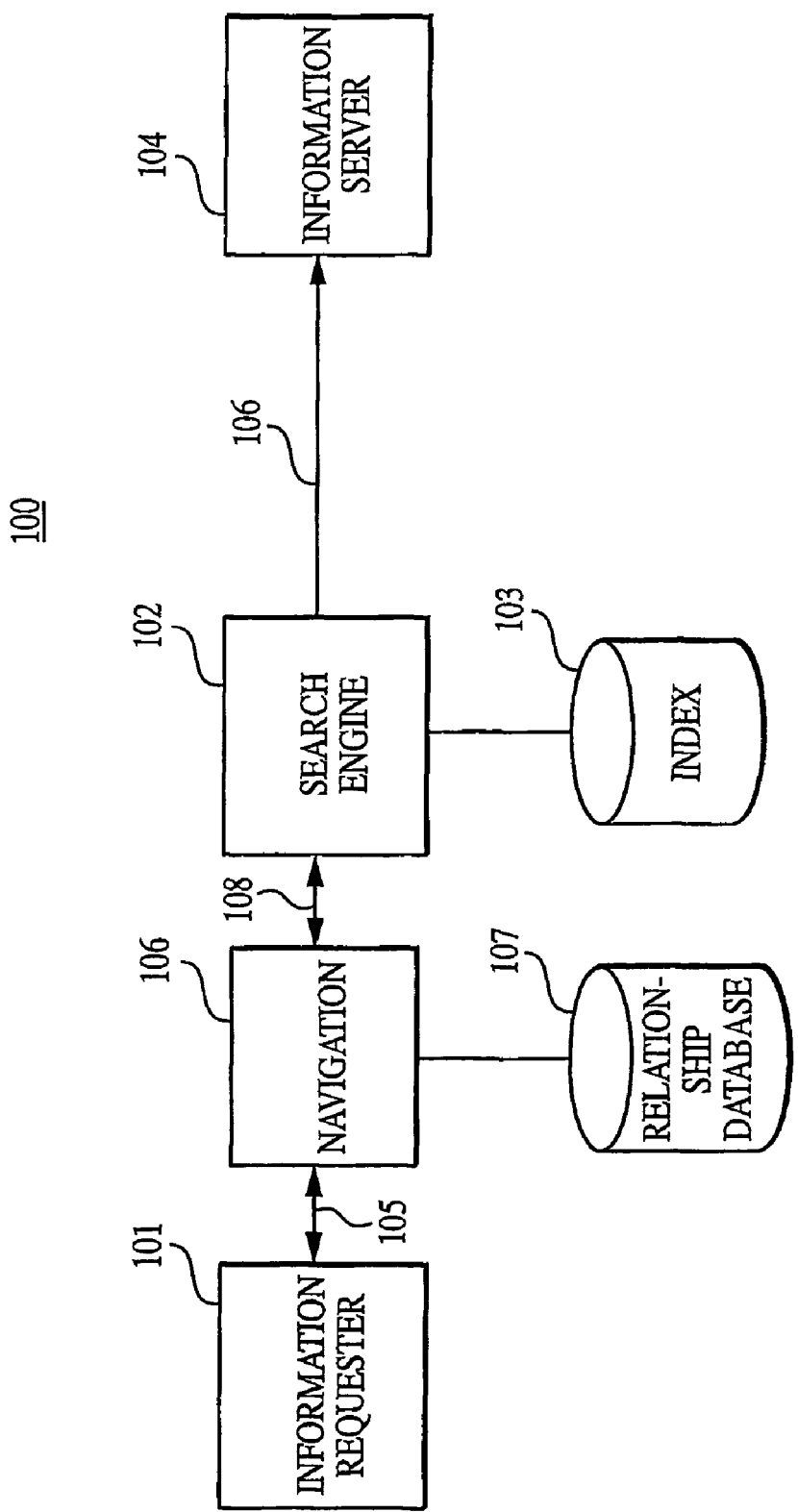
FIG. 1 is an exemplary block diagram of the information retrieval system in accordance with the principles of the present invention.

In particular, FIG. 1 shows an illustrative embodiment of the information retrieval system 100 in accordance with the principles of the present invention, which may comprise, in relevant part, inter alia, an information requester 101, a navigation interface/server 106, a search engine 102 and an information server 104. The information retrieval system 100 maybe any system in which a plurality of informational items are available to be searched and retrieved. For example, the entire information retrieval system 100 may be housed within a single computer system, where the information server 104 may comprise a database containing a plurality of informational items stored in a mass storage device, e.g., a hard disk or the like, and where the information requester 101 may be a user interface through which a user may initiate a search and retrieval session with the search engine 102, which in turn may be an application program running on the computer. In this example, the communication interfaces 105 and 108 may be, e.g., bus(s) within the computer system.

Alternately, the information retrieval system 100 may even comprise a single computer program, in which each of the information server 104, information requester 101 and the search engine 102 may comprise a sub-component of the single computer program. In this case, the communications interfaces 105 and 108 may themselves be computer routines acting as, e.g., program interfaces.

In a yet another alternative embodiment, the information retrieval system 100 may comprise a plurality of computers connected via a computer network. For example, the communication interfaces 105 and 108 may be a wide area network (WAN), e.g., the Internet, the world wide web (WWW), Public Switched Telephone Network (PSTN), or the like, through which each of the information requester 101, the navigation interface 106, the search engine 102 and the information server 104 communicate. The information requester 101 may be, e.g., a personal computer connected to the Internet, e.g., via a modem or the like. The information server 104 may comprise a plurality of computers, e.g., web servers, distributed over the WAN 105, 108, e.g., the Internet. The search engine 102 may comprise any currently available and known search engines, e.g., the YAHOO™, EXCITE™, and the like, and may maintain an index 103 of the entire content of the WWW parsed into searchable words and corresponding locations. An example of a known search engine and the associated index may be found from, e.g., U.S. Pat. No. 6,021,409 issued Feb. 1, 2000 to Michael Burrows, the entirety of which is hereby incorporated by reference.

Significantly, the information retrieval system 100 may further comprise a navigational interface 106 having a relationship database 107. The navigational interface 106 provides an interface between the information requester 101 and the rest of the information retrieval system 100, and may comprise a server, e.g., one or more computers, allowing the information requester 101 to establish an information retrieval session, and to navigate through the various informational items in the information retrieval system 100. A navigation refers herein to generally the process of sequentially selecting and viewing one or more informational items.

Alternatively, the navigational interface 106 and/or the relationship database 107 may be implemented as a part of the user interface, e.g., a web browser, of the information requester 101, or even as a part of the search engine 102.

FIG. 2 shows an exemplar table illustrating the relevant portions 200 of the relationship database 107. The relationship database 107 in accordance with one aspect of the present invention comprises, inter alia, an information item field 201 that uniquely identifies information items, INFO#1 to INFO#N, which may preferably be the location pointers, e.g., the URL in the case of WWW pages, for the actual informational items, a related informational item field 202, which contains one or more informational items, e.g., INFO#A to INFO#Z, that are related to the informational item in the informational item field 201.

The relationship database 107 may further comprise a relationship type field 203, which defines the similarities between the respective characteristics of the informational items that are related, and a relationship strength field 204, which indicates the strength of the relationships between a pair of informational items based on the historical frequency of the pair being selected by a user during a single information retrieval session. In a preferred embodiment of the present invention, the relationship strength 204 comprises a value indicator represented as an integer, e.g., 2, 4, etc.

According to the principles of the present invention, a related informational item record in the table 200 is created when at least two informational items are selected by a user during an information retrieval session. For example, during an information retrieval session, the user has navigated through informational items, INFO ITEM 1, INFO ITEM A and INFO ITEM B, a relational record for each of the pairs, INFO ITEM 1/INFO ITEM A, INFO ITEM 1/INFO ITEM B and INFO ITEM A/INFO ITEM B, may be created if the respective records do not already exist in the database 107. Alternately, an embodiment of the present invention may create records only for information pairs which are selected consecutively, i.e., only for the pairs, INFO ITEM 1/INFO ITEM A and INFO ITEM 1/INFO ITEM B, in the proceeding example. A yet another alternative embodiment of the present invention may create records for any pair of informational items which are viewed during the information retrieval session. For example, a record may be created between the first and last informational items to indicate a relationship from the start of the session to the finish of the session.

The relationship type, by way of example only, may be, in an information retrieval system comprising informational items regarding a book collection of a library, a common author, a common 14 publisher and common subject, or the like, shared by the related pair of informational items.

According to a preferred embodiment of the present invention, a "general" relationship type is provided, and whenever a pair of informational items are selected during an information retrieval session, a record for the general relationship type is always created in addition to the possible record with respect to the above described common trait relationship type.

The relationship strength may initially be assigned a value of, e.g., 1, the first time the record is created, and adjusted based on the subsequent frequency of the pair being selected together in an information retrieval session.

FIG. 2A shows an example of the contents of the table shown in FIG. 2. In this example, the informational item "Rose" has a number of informational items related thereto, i.e., the informational items, "Fire Truck", "Daisy" and "Shakespeare", which share some common traits. For example, the informational item "Rose" and the related informational item "Fire Truck" are both red in color. The example also shows that the relationship strength of the informational item "Rose" and the related informational item "Fire Truck" sharing the same color red has a current relationship strength value of 4.

In operation, when a user selects an informational item, e.g., the informational item "Rose" during an information retrieval session, the navigation interface 106 displays a list of informational items that are related to the selected informational item "Rose", an exemplar display of which is shown in FIG. 3.

Figure 2B:
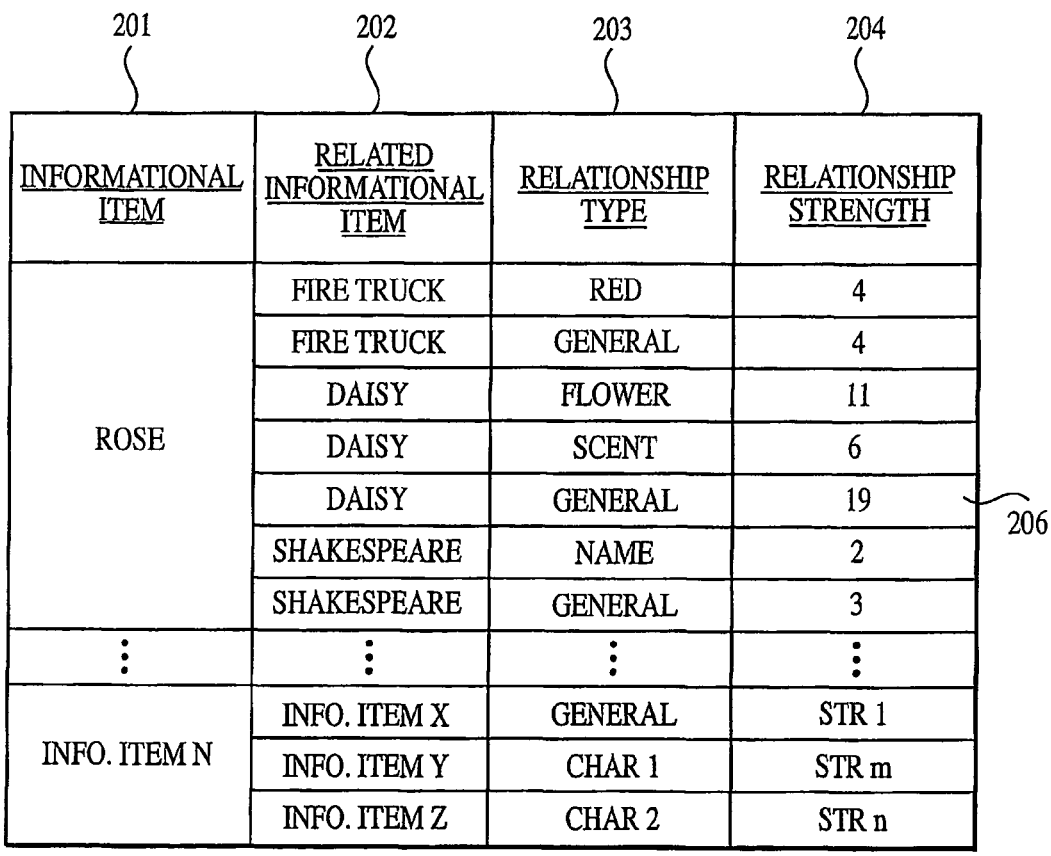
FIG. 2B is an exemplary table showing a change in the contents of the table shown in FIG. 2A as a result of a user action.

As shown in FIG. 3, the user is provided with a selection display 304 including a related information portion 308, in which the related informational item records from the table shown in FIG. 2 to FIG. 2B are listed. In a preferred embodiment, the related informational items are grouped by the relationship types as shown by the reference numerals 309, 312, 315, 318 and 321, and are sorted and listed, within each of the groups, in descending order of the respective relationship strengths as shown by the reference numeral 310. Preferably, in each of the groupings, 309, 312, 315, 318 and 321, in order to provide an uncluttered and ergonomic display, only a few informational items having higher relationship strengths are shown along with an option to view more selections by clicking on one of the "MORE" links, 311, 314, 317, 320 and 323.

Optionally, the selection display 304 allows the user to choose to view the originally selected informational item, "Rose" without selecting any of the related informational items by clicking on the link 305.

When the user selects the informational item "Daisy" by clicking on the "Daisy" link 310 from the "general" relationship type group 309, the relationship strength for the general relationship type relationship record for the related informational items pair ROSE/DAISY is increased by a predetermined amount, e.g., from 18 to 19, as indicated by reference numerals 205 and 206 in FIG. 2A and FIG. 2B, respectively.

Figure 4A:
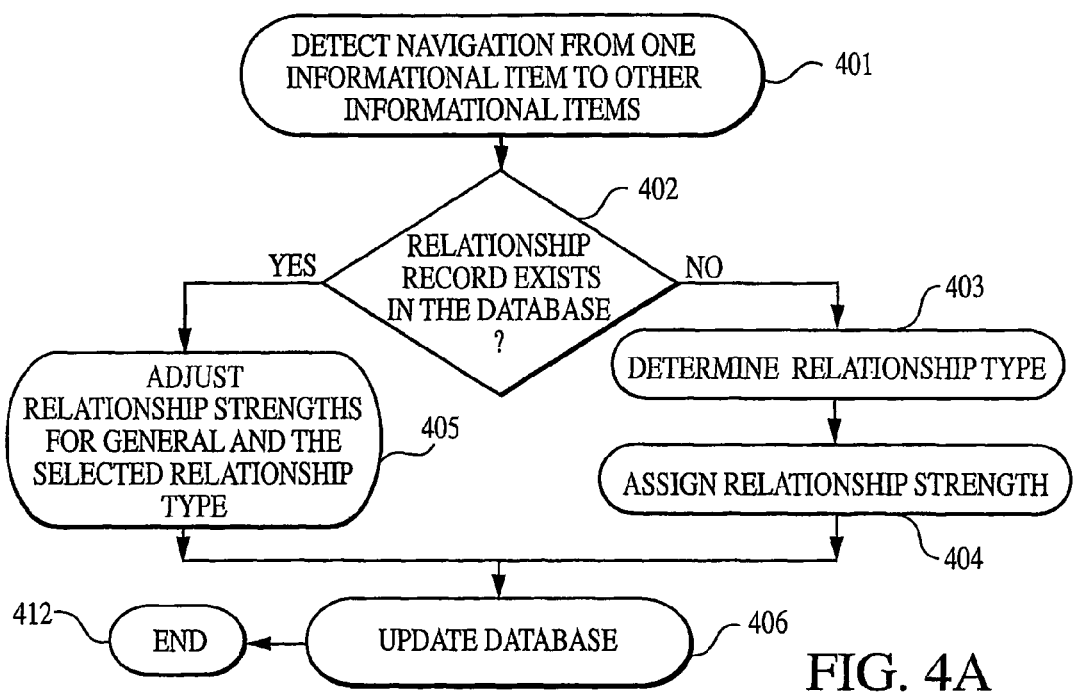
FIG. 4A is a flow diagram showing an exemplary embodiment of the related relationship database update method in accordance with the principles of the present invention.

The inventive process of providing related informational items will now be described with references to FIGS. 4A and 4B. In particular, as shown in FIG. 4A, instep 401, the present inventive navigational interface 106 detects a navigation from one informational item to at least one other informational item, e.g., from the informational item "Rose" to the informational item "Daisy", then to the informational item "Fire Truck".

In step 402, a determination is made whether relationship records for any of the ROSE/DAISY, ROSE/FIRE TRUCK and the DAISY/FIRE TRUCK pairs already exist in the database 107. If any of the informational items do not already have a relationship record in the database, in step 403, a relationship type is determined for the missing pair. In an embodiment of the present invention, a record for each informational items pair with the "general" relationship type is created. In addition, a new record for each identified common trait of each pair is created. It is possible that a pair may have no common trait (e.g., the DAISY/FIRE TRUCK pair), in which case only the general relationship type record is created. It may also be possible that a pair may share more than one common trait (e.g., the ROSE/DAISY pair may share traits, "flower" and "scent").

In step 404, for each record newly created, an initial value of the respective relationship strength is assigned, e.g., an initial value of 1. For example, if none of the pairs has an existing relationship record, then after the operations of steps 403 and 404, the resulting new records may be as shown in Table I below:

TABLE I

| Informational Item | Related Informational Item | Relationship Type | Relationship Strength |
|---|---|---|---|
| Rose | Fire truck | General | 1 |
| Rose | Fire truck | Red | 1 |
| Rose | Daisy | General | 1 |
| Rose | Daisy | Flower | 1 |
| Rose | Daisy | Scent | 1 |
| Daisy | Rose | General | 1 |
| Daisy | Rose | Flower | 1 |
| Daisy | Rose | Scent | 1 |
| Fire Truck | Rose | General | 1 |
| Fire Truck | Rose | Red | 1 |
| Daisy | Fire Truck | General | 1 |
| Fire Truck | Daisy | General | 1 |

If, on the other hand, in step 402, a determination is made that at least one of the informational item pairs has an existing record in the database 107, then, in step 405, the relationship strength for the existing record(s) is increased by a predetermined amount, e.g., by 1. According to an embodiment of the present invention, if a record exists in the database, the related information would have been displayed (e.g., as shown in FIG. 3), and the user selects therefrom. If the user had selected the related informational item from a group other than the general relationship type group, the relationship strength record corresponding to that selected relationship type would also be increased as well as for the record corresponding to the general relationship type.

In step 406, the database 107 is updated to reflect the newly created records and/or the relationship strength(s) adjustment(s). In one embodiment of the present invention, the database 107 is updated in real time, i.e., whenever a new record is created or a relationship strength adjustment is made. In an alternative embodiment, the database may be updated off-line by collecting the navigational history of users of the information retrieval system in one or more history log file. The history log file may be examined periodically, i.e., daily, monthly, etc., to detect any navigation from an informational item to another informational item to generate new relationship records and/or to make relationship strength adjustments therefrom.

Figure 4B:
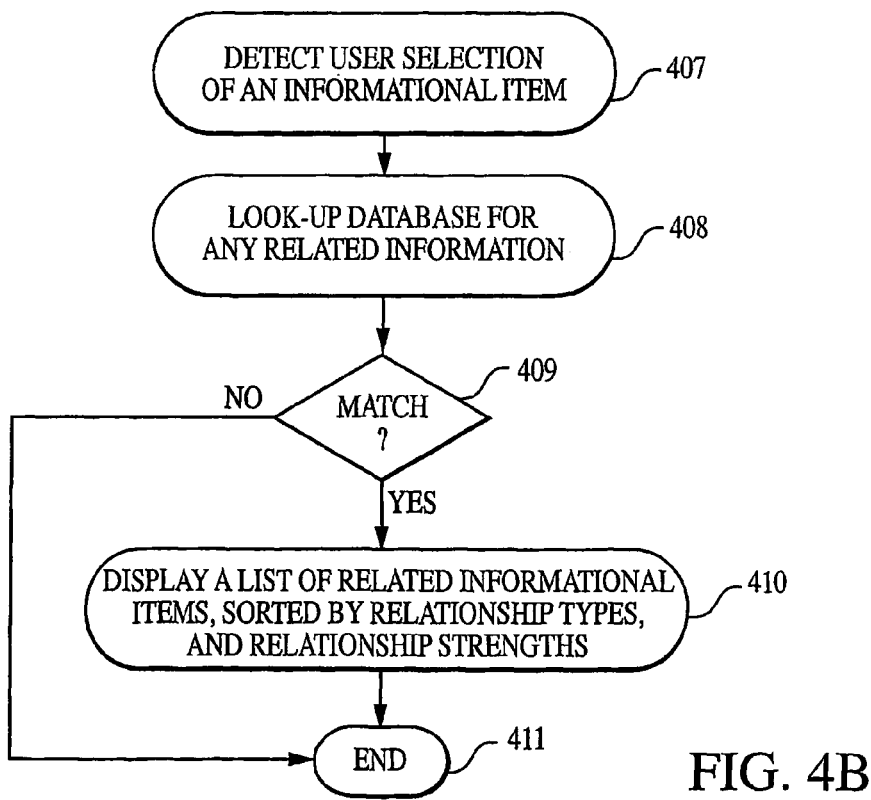
FIG. 4B is a flow diagram showing an exemplary embodiment of the related information provision method in accordance with the principles of the present invention.

FIG. 4B shows an exemplary embodiment of the inventive related information provision process, in which when a user selection of an informational item is detected in step 407, the navigational interface 106 performs, in step 408, a look-up operation of the database 107 to determine whether any relationship record exists for the selected informational item. If a determination is made that there is a match, i.e., the selected informational item has an existing relationship record in the relationship database 107, the matching related informational items are grouped by the relationship types, sorted based on the relationship strengths, and displayed as shown, e.g., in FIG. 3.

If, on the other hand, no relationship record exists for the selected informational item, then the process ends in step 411 without displaying any related informational item.

As can be appreciated, the inventive relevant informational item provisioning system described above, provides an efficient and economical navigational tool, by which a user of an information retrieval system may find a desired informational item with less effort and time, by suggesting related informational items which are historically proved useful, and by allowing the user to reap the benefits of the efforts made during a prior information retrieval session and/or by prior users.

In another aspect of the present invention, the relationship database 107 may include a relationship type "HELP" to allow a dynamic context sensitive mapping of help informational items in a help information retrieval system. In contrast to a conventional help information retrieval system, which maintains a fixed mapping of the help informational items (i.e., the selection choices for help items are always the same without regard to the context within which a user seeks help), the help information retrieval system in accordance with the present invention provides a context sensitive mapping, in which help items from which a user chooses are varied depending on the informational item being viewed by the user at the time of the invocation of help. Moreover, the mapping of the help items according to the present invention is dynamically updated based on the usage of the system to further enhance the context sensitive nature thereof.

In particular, FIG. 5 shows an exemplar table illustrating the relevant portions 500 of the relationship database 107 as adapted for implementation of the help information retrieval system in accordance with the principles of the present invention. As shown in FIG. 5, the table 200 shown in FIG. 2 is modified to include relationship records 505 each having a relationship type "HELP". The help relationship records 505 in accordance with one aspect of the present invention may comprise, inter alia, an information item field 501 containing the location identifiers, ITEM LOC 1 to ITEM LOC N, e.g., the URL in the case of WWW pages, for the originating informational item, a related informational item field 502, which contains one or more informational item identifiers, e.g., INFO ITEM D to INFO ITEM S, of help items that are relevant to the informational item corresponding to the location identifier in the informational item field 501.

Each of the help relationship records 505 may further comprise a relationship type field 503, which is always "HELP" type, and a relationship strength field 504, which indicates the strength of the relationships between the location, e.g., the 1 mM LOC 1, and the help item, e.g., the INFO ITEM D, pair based on the historical frequency of the help item being selected by a user who seeks help while originating at that location. In an embodiment of the present invention, the relationship strength 504 comprises a value indicator represented as an integer, e.g., 2, 4, etc.

According to the principles of the present invention, a help relationship record 505 in the table 500 is created when a help item is selected by a user during a help information retrieval session, which was initiated while viewing an informational item.

For example, when a user invokes help session by, e.g., clicking on the "help" button (not shown), while currently viewing an informational item located at ITEM LOC N during an information retrieval session, and selects a help item INFO ITEM Q, another help item INFO ITEM R, and subsequently the help item INFO ITEM S, a help relationship record may be created for each of the pairs, ITEM LOC N/INFO ITEM Q, ITEM LOC N/INFO ITEM R and ITEM LOC N/INFO ITEM S if the records do not exist in the table 500 already.

The relationship strength may initially be assigned a value of, e.g., 1, the first time a record is created, and adjusted based on the subsequent frequency of the help item being selected in a help session initiated while viewing the informational item.

Figure 6:
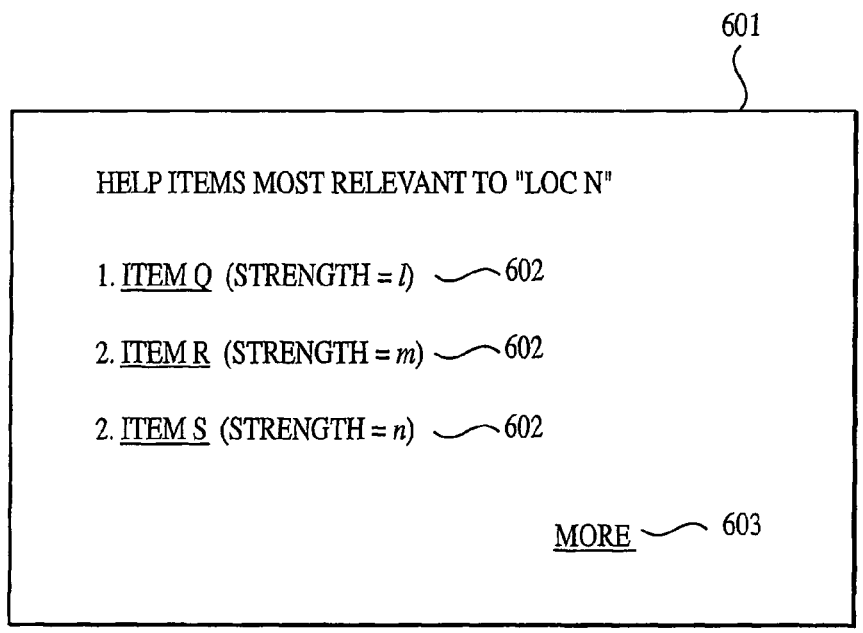
FIG. 6 shows an exemplary embodiment of the user interface screen of the help information retrieval system in accordance with the principles of the present invention.

In operation, when a user seeks help while viewing an information item, e.g., located at ITEM LOC N, the inventive help information retrieval system presents the user with a display 601 shown in FIG. 6. As shown in FIG. 6, the user is provided with a selection display 601, in which the relevant help items as determined from the table shown in FIG. 5 are listed. In a preferred embodiment shown in FIG. 6, the help items are sorted and listed in descending order of the respective relationship strengths as shown by the reference numeral 602. Preferably, in order to provide an uncluttered and ergonomic display, only a few help items having higher relationship strengths are shown along with an option to view more selections by clicking on the "MORE" link 603.

When user selects one of the listed help items, e.g., the help item INFO ITEM R by clicking on the link "ITEM R", the relationship strength of the help relationship record for the ITEM LOC N/INFO ITEM R is increased by a predetermined amount, e.g., a one (1).

The inventive process of providing context sensitive help items will now be described with references to FIGS. 7A and 7B.

Figure 7A:
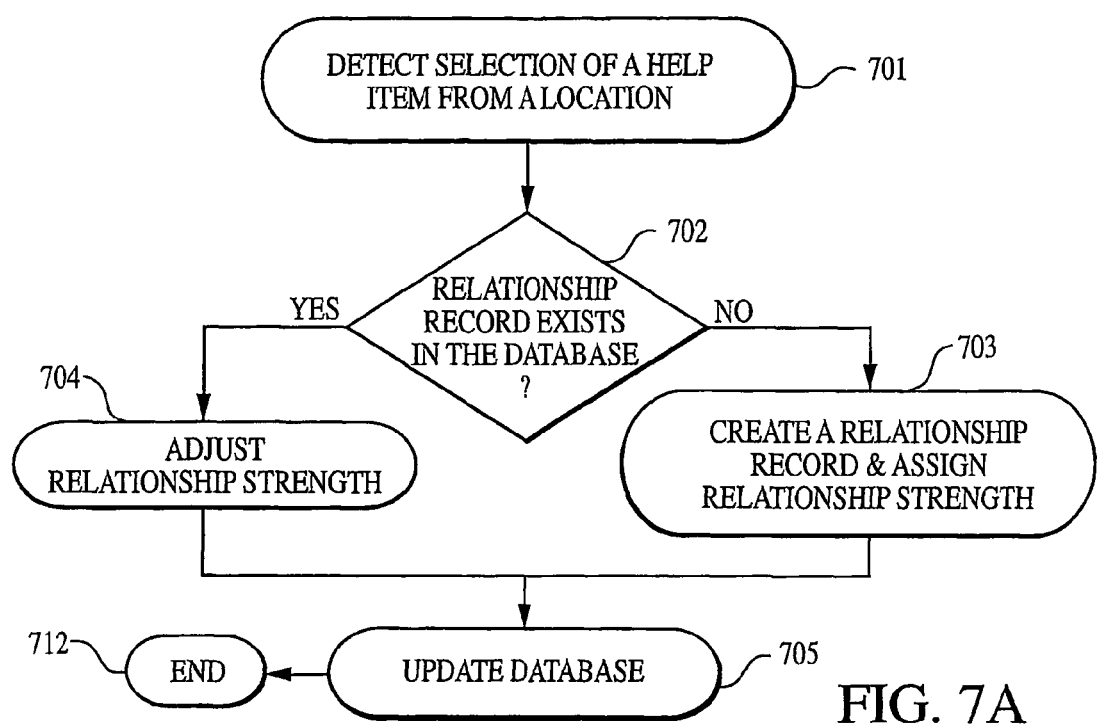
FIG. 7A is a flow diagram showing an exemplary embodiment of the related help information database update method in accordance with the principles of the present invention.

As shown in FIG. 7A, in step 701, the inventive help information retrieval system detects a selection of a help item, e.g., the help item INFO ITEM R, by a user during a help session, which was initiated when the user was viewing an informational item at a location, e.g., ITEM LOC N.

Upon the detection, in step 702, a determination is made whether a help relationship record for the ITEM LOC N/INFO ITEM R pair already exists in the table 500. If the help relationship record does not already exist in the table, in step 703, a new help relationship record is created, and an initial value of the relationship strength therefor is assigned, e.g., the initial value is set to a one (1).

If, on the other hand, in step 702, a determination is made that the help relationship record already exists in the table, then, in step 704, the relationship strength for the existing record is increased by a predetermined amount, e.g., by 1.

In step 705, the table 500 is updated to reflect the newly created record and/or the relationship strength adjustment. In one embodiment of the present invention, the table 500 is updated in real time, i.e., whenever a new record is created or a relationship strength adjustment is made. In an alternative embodiment, the database may be updated off-line by collecting the help session history of users of the information retrieval system in one or more history log file. The history log file may be examined periodically, i.e., daily, monthly, etc., to determine the originating informational item(s) and any help item(s) selected to generate new relationship records and/or to make relationship strength adjustments therefrom.

Figure 7B:
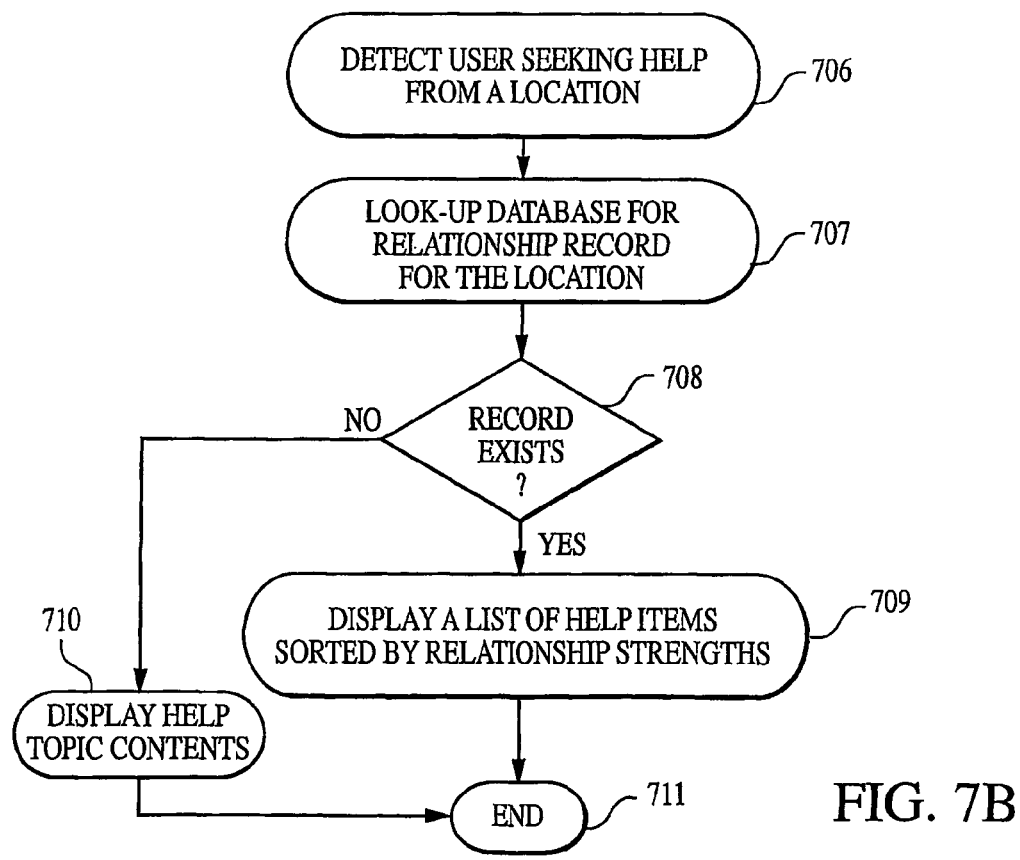
FIG. 7B is a flow diagram showing an exemplary embodiment of the related help information provision method in accordance with the principles of the present invention.

FIG. 7B shows an exemplary embodiment of the inventive related help information provision process, in which when a user initiation of a help session is detected in step 706, the help information retrieval system of the present invention performs, in step 707, a look-up operation of the table 500 to determine whether any help relationship records exist for the location corresponding to the informational item from which the help session originated. If a determination is made that one or more help relationship record(s) already exist in the table 500, the matching help items are sorted based on the relationship strengths, and displayed, e.g., as shown in FIG. 6.

If, on the other hand, no help relationship record exists for the originating informational item location in the table 500, in step 710, a conventional help topic contents, as is well known, is provided for the user to select a help item therefrom. When the user selects a help item from the help topic contents, the selection is detected as shown in step 701, and the location/info item pair of the originating informational item and the selected help item is processed through steps 702 to 705 to create and store a new help relationship record in the table 500.

As can be appreciated, the inventive help information retrieval system described above allows a mapping of help items, which is sensitive to the context within which a user is seeking help, i.e., by providing originating location specific selection choices of help items. Moreover, the mapping is allowed to be dynamically updated based on the usage behavior to provide more relevant selection choices and thus a more efficient use of the help information retrieval system.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method of providing a context sensitive mapping of a plurality of help informational items in an information retrieval system, comprising the steps of:

establishing a database for maintaining at least one record entry, the at least one record entry defining a relationship between an originating location from which a help request originates and corresponding locations of the plurality of help informational items that are related to the originating location, wherein the originating location is one of the plurality of help informational items and the at least one record entry includes a relationship type which is based on characteristic similarities between the originating location and the help informational items that are related to the originating location, and a relationship strength value which is based on historical frequency of selection from the originating location by a user of the help informational items that are related to the originating location;

detecting a subsequent user's selection of a help informational item from the originating location;

presenting to the subsequent user, if a relationship record for the help informational item exists in the database, a plurality of help informational items that are related to the help informational item selected by the subsequent user, which are sorted based on respective relationship types and relationship strength values; and presenting to the subsequent user, if a relationship record for the help informational item does not exist in the database, a conventional help topic content.

2. The method of claim 1, wherein the step of presenting the plurality of help informational items that are related to the help informational item selected by the subsequent user further includes a step of presenting a sorted list based on the respective relationship types and relationship strength values from which the subsequent user can select, thereby benefiting from a prior user's navigation of the selected help informational item.

3. The method of claim 1, further comprising a step of updating the relationship strength value.

4. An apparatus for providing a context sensitive mapping of a plurality of help informational items in an information retrieval system, comprising:

a database for maintaining at least one record entry, the at least one record entry defining a relationship between an originating location from which a help request originates and corresponding locations of the plurality of help informational items that are related to the originating location, wherein the originating location is one of the plurality of help informational items and the at least one record entry includes a relationship type which is based on characteristic similarities between the originating location and the help informational items that are related to the originating location, and a relationship strength value which is based on historical frequency of selection from the originating location by a user of the help informational items that are related to the originating location; and a navigation interface for detecting a subsequent user's selection of a help informational item from the originating location, for presenting to the subsequent user, if a relationship record for the help informational item exists in the database, a plurality of help informational items that are related to the help informational item selected by the subsequent user, which are sorted based on respective relationship types and relationship strength values, and for presenting to the subsequent user, if a relationship record for the help informational item does not exist in the database, a conventional help topic content.

5. The apparatus of claim 4, wherein the navigation interface is adapted for presenting a sorted list based on the respective relationship types and relationship strength values from which the subsequent user can select, thereby benefiting from a prior user's navigation of the selected help informational item.

6. The apparatus of claim 4, wherein the navigation interface is adapted for updating the relationship strength value.

7. A computer readable storage medium having stored thereon computer program for implementing a method of providing a context sensitive mapping of a plurality of help informational items in an information retrieval system, said computer program comprising a set of instructions for:

establishing a database for maintaining at least one record entry, the at least one record entry defining a relationship between an originating location from which a help request originates and corresponding locations of the plurality of help informational items that are related to the originating location, wherein the originating location is one of the plurality of help informational items and the at least one record entry includes a relationship type which is based on characteristic similarities between the originating location and the help informational items that are related to the originating location, and a relationship strength value which is based on historical frequency of selection from the originating location by a user of the help informational items that are related to the originating location;

detecting a subsequent user's, selection of a help informational item from the originating location;

presenting to the subsequent user, if a relationship record for the help informational item exists in the database, a plurality of help informational items that are related to the help informational item selected by the subsequent user, which are sorted based on respective relationship types and relationship strength values; and presenting to the subsequent user, if a relationship record for the help informational item does not exist in the database, a conventional help topic content.

8. The computer readable storage medium according to claim 7, wherein the step of presenting the plurality of help informational items that are related to the help informational item selected by the subsequent user further includes a step of presenting a sorted list based on the respective relationship types and relationship strengths from which the subsequent user can select, thereby benefiting from a prior user's navigation of the selected help informational item.

9. The computer readable storage medium according to claim 7, further comprising an instruction for updating the relationship strength value.

* * * * *

UNITED STATES PATENT AND TRADEMARK OFFICE
CERTIFICATE OF CORRECTION

PATENT NO. : 6,985,893 B1
DATED : January 10, 2006
INVENTOR(S) : Douglas K. Warner and Michael A. Myer It is certified that error appears in the above-identified patent and that said Letters Patent is hereby corrected as shown below:

<u>Title page,</u>
Insert Item -- [73] Assignee: RightNow Technologies, Inc. --.

<u>Column 4,</u>
Line 32, reads "100 maybe any" should read -- 100 may be any --.

<u>Column 6,</u>
Line 1, reads "common 14 publisher" should read -- common publisher --.

<u>Column 8,</u>
Line 57, reads "the 1 mM LOC1" should read -- the ITEM LOC1 --.

<u>Column 9,</u>
Line 31, reads "ITEM R" should read -- <u>ITEM R</u> --.

Signed and Sealed this

Thirteenth Day of June, 2006

JON W. DUDAS
*Director of the United States Patent and Trademark Office*